(12) United States Patent
Neathery et al.

(10) Patent No.: US 10,642,273 B2
(45) Date of Patent: May 5, 2020

(54) MARINE DRIVE CONTROL OF A MARINE VESSEL IN A CONFIGURED OPERATION MODE

(71) Applicant: Caterpillar Inc., Deerfield, IL (US)

(72) Inventors: Brian Neathery, Hockey, TX (US); Jonathan Steinbrink, Cypress, TX (US); Hashim Marzuq, Houston, TX (US); Ben Pulley, Oak Creek, WI (US); Gino George, Thrissur (IN)

(73) Assignee: Caterpillar Inc., Peoria, IL (US)

( * ) Notice: Subject to any disclaimer, the term of this patent is extended or adjusted under 35 U.S.C. 154(b) by 4 days.

(21) Appl. No.: 16/047,209

(22) Filed: Jul. 27, 2018

(65) Prior Publication Data

US 2020/0033861 A1  Jan. 30, 2020

(51) Int. Cl.
*G05D 1/02* (2020.01)
*B63H 20/12* (2006.01)

(52) U.S. Cl.
CPC ........... *G05D 1/0206* (2013.01); *B63H 20/12* (2013.01)

(58) Field of Classification Search
CPC .............................. G05D 1/0206; B63H 20/12
USPC .......................................................... 701/21
See application file for complete search history.

(56) References Cited

U.S. PATENT DOCUMENTS

| 7,267,068 | B2 | 9/2007 | Bradley et al. | |
|---|---|---|---|---|
| 8,060,265 | B2 | 11/2011 | Hallenstvedt et al. | |
| 8,234,024 | B2 * | 7/2012 | Nose ...................... | B63H 25/42 114/144 RE |
| 8,428,801 | B1 | 4/2013 | Nose et al. | |
| 9,067,664 | B2 | 6/2015 | Yuet et al. | |
| 9,545,987 | B1 | 1/2017 | Przybyl et al. | |
| 2006/0058930 | A1 * | 3/2006 | Graham ................. | B63H 21/21 701/21 |
| 2009/0197486 | A1 | 8/2009 | Szilagyi et al. | |
| 2010/0138083 | A1 * | 6/2010 | Kaji ....................... | B63H 25/02 701/21 |

* cited by examiner

*Primary Examiner* — Brian P Sweeney
(74) *Attorney, Agent, or Firm* — Leydig, Voit & Mayer Ltd.

(57) ABSTRACT

A marine vessel may be controlled by a device receiving an input to place a drive system of a marine vessel into an operation mode; positioning two or more marine drive units of the drive system in a first configuration based on the input; identifying, and while the drive system is in the operation mode, that respective throttles associated with the two or more marine drive units are in a same drive position; and repositioning the two or more marine drive units to a second configuration based on identifying that the respective throttles are in the same drive position.

20 Claims, 3 Drawing Sheets

MARINE DRIVE CONTROL OF A MARINE VESSEL IN A CONFIGURED OPERATION MODE

TECHNICAL FIELD

The present disclosure relates generally to control of a marine vessel and, more particularly, to marine drive control of a marine vessel in a configured operation mode.

BACKGROUND

Marine vessels are used in a variety of applications to provide transportation over waterways, such as oceans, lakes, rivers, and/or the like. A marine vessel propulsion system may include multiple propulsion devices (e.g., marine drive units). In some instances, the propulsion devices can rotate relative to a center line of the marine vessel to enable steering of the marine vessel. In some instances, the marine vessel propulsion system may include marine drive units mounted or installed on a hull of the marine vessel. Such marine drive units (which may be referred to as "pods") may be configured to have a threshold range of rotation. In some instances, the marine drive units may rotate 360 degrees. The threshold range of rotation may be mechanically controlled or limited and/or electronically controlled or limited.

One attempt to implement such a marine drive propulsion system is disclosed in U.S. Pat. No. 8,234,024 that issued to Nose et al. on Jul. 31, 2012 ("the '024 patent"). In particular, the '024 patent discloses first and second propulsion devices arranged to be mounted on a hull, a first operation lever arranged to be operated by a marine vessel maneuvering operator to control the first propulsion device to have a shift state selected from among a forward drive state, a neutral state, and a reverse drive state and to control a power output of the first propulsion device, a second operation lever arranged to be operated by the marine vessel maneuvering operator to control the second propulsion device to have a shift state selected from a forward drive state, a neutral state, and a reverse drive state and to control a power output of the second propulsion device, and a control unit programmed to set a target pivoting speed according to the positions of the first and second operation levers.

While the propulsion system of the '024 patent may facilitate steering of a marine vessel, the '024 vessel does not address adjusting position of the first propulsion device or the second propulsion device using the first and second operation levers based on the vessel being in a particular operation mode.

The drive controller of the present disclosure solves one or more of the problems set forth above and/or other problems in the art.

SUMMARY

According to some implementations, a method may include receiving an input to place a drive system of a marine vessel into an operation mode; positioning, by the device, two or more marine drive units of the drive system in a first configuration based on the input; identifying, by the device and while the drive system is in the operation mode, that respective throttles associated with the two or more marine drive units are in a same drive position; and repositioning, by the device, the two or more marine drive units to a second configuration based on identifying that the respective throttles are in the same drive position.

According to some implementations, a device may include one or more processors to receive an operation mode input to place a drive system, of a marine vessel, into an operation mode; configure a first marine drive unit and a second marine drive unit to be positioned in a first configuration based on the operation mode input, wherein the first configuration corresponds to positioning the first marine drive unit and the second marine drive unit for control of the marine vessel while the drive system is in the operation mode; identify, while the drive system is in the operation mode, that a first throttle and a second throttle are both in a same drive position, wherein the first throttle is associated with the first marine drive unit and the second throttle is associated with the second marine drive unit; and configure the first marine drive unit and the second marine drive unit to be repositioned into a second configuration while both the first throttle and the second throttle are in the same drive position.

According to some implementations, a non-transitory computer-readable medium storing instructions that, when executed by one or more processors, cause the one or more processors to: receive an input to place a drive system, of a marine vessel, into an operation mode; position two or more marine drive units, of the drive system, in a first configuration based on the input, wherein, when in the first configuration, each of the two or more marine drive units are configured to generate propulsion in different directions relative to a center line of the marine vessel; identify, while the drive system is in the operation mode, that a throttle control, associated with the two or more marine drive units, is in a same drive position; and position the two or more marine drive units into a second configuration based on the throttle control being in the same drive position, wherein, when in the second configuration, each of the two or more marine drive units are configured to generate propulsion in a same direction relative to the center line of the marine vessel.

DETAILED DESCRIPTION

This disclosure relates to a drive controller for a drive system of a marine vessel. The drive system has universal applicability to any marine vessel utilizing such a drive system. The term "marine vessel" may refer to any marine vessel that performs an operation associated with an industry such as, for example, recreation, fishing, transportation, shipping, and/or the like. As some examples, the marine vessel may be a power boat, a sail boat (with a marine propulsion system), a hovercraft, an air boat, an amphibious vehicle, a submarine, or another type of vehicle that is capable of traversing a waterway, such as an ocean, lake, river, and/or the like. Moreover, one or more implements may be connected to the marine vessel, drive system, and/or controlled or driven from a drive controller.

Figure 1:
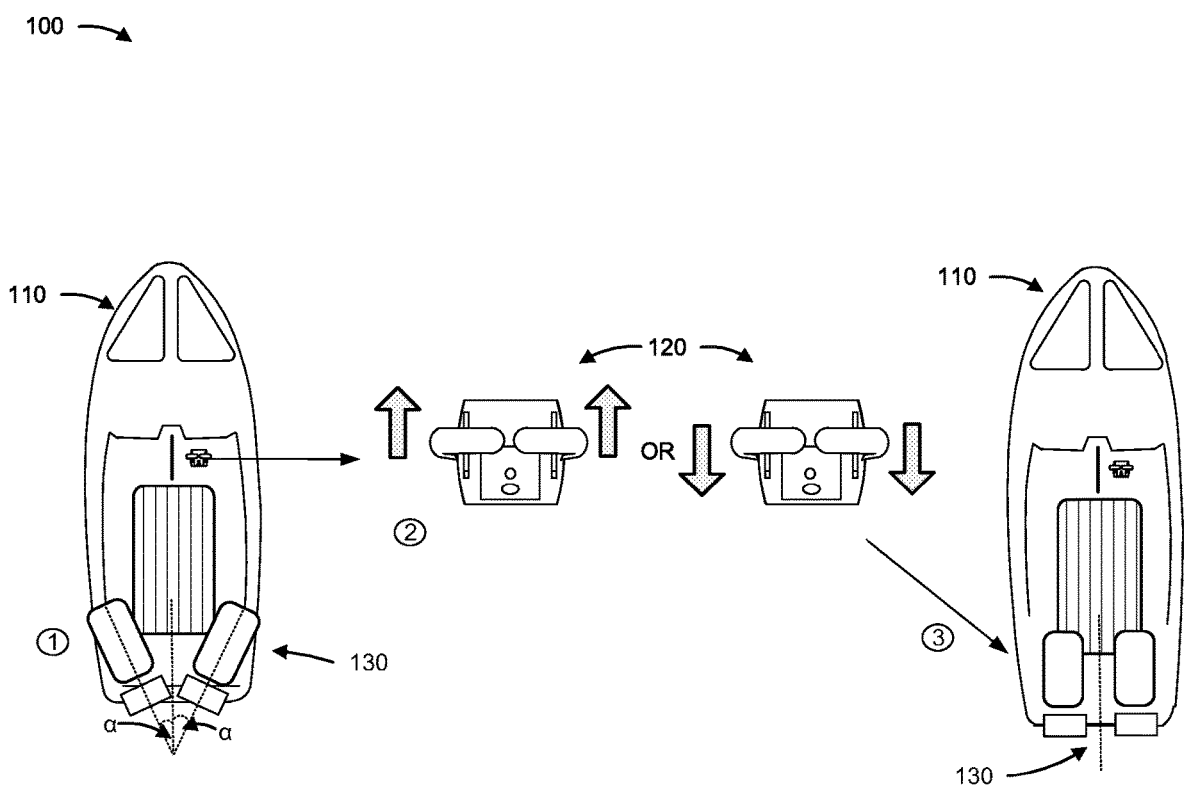
FIG. 1 is a diagram of an example implementation associated with marine drive control as described herein.

FIG. 1 is a diagram of an example implementation associated with marine drive control as described herein. In the example of FIG. 1, a marine vessel 110 may be controlled by a throttle control 120 and a marine propulsion system 130. For example, a speed of marine vessel 110, a direction of travel of marine vessel 110, a power output of a marine drive unit of the marine vessel 110, and/or the like may be controlled according to a setting of throttle control 120 to operate marine propulsion system 130. Accordingly, an operator (e.g., a captain or crewman) of marine vessel 110 can control the speed and/or direction of travel of marine vessel 110 using throttle control 120. As shown in FIG. 1, throttle control 120 may include two throttle levers (a port-side throttle lever and a starboard-side lever) and the marine propulsion system 130 may include two marine drive units (a port-side marine drive unit and a starboard-side marine drive unit). In the example of FIG. 1, the port-side throttle lever may control the port side marine drive unit and the starboard-side throttle lever may control the starboard-side marine drive unit. In some implementations, throttle control 120 may include more than two throttle levers and marine propulsion system 130 may include more than two marine drive units.

As shown in FIG. 1, and by phase 1 of example implementation 100, marine vessel 110 is placed into an operation mode that vectors the marine drive units, of marine propulsion system 130, at an angle α relative to a center line of marine vessel 110. For example, an operator of marine vessel 110 may use a user interface to provide an operation mode input to a drive controller of the marine vessel 110. When in such an operation mode, the marine drive units of marine propulsion system 130 are vectored to permit a stern of marine vessel 110 to be directed toward the port-side or the starboard-side faster than if the marine drive units were configured in a parallel manner. For example, the operator can move the port-side throttle lever forward, while the starboard-side throttle remains in neutral or is in reverse, to increase thrust or propulsion from the port-side marine drive unit, thus steering the stern of the marine vessel toward the port-side. Additionally, or alternatively, the operator can move the starboard-side throttle lever forward, while the starboard-side throttle remains in neutral or is in reverse, to increase thrust from the starboard-side marine drive unit, thus steering the stern of the marine vessel toward the starboard-side. The speed at which the stern of the vessel is steered in the desired direction may depend on the amount of throttle applied by the throttle levers (or the distance between the throttle lever and a neutral position of throttle control 120).

As further shown in FIG. 1, and by phase 2 of example implementation 100, both the port-side throttle and the starboard-side throttle are shifted in the same direction or into a same drive position. For example, an operator may shift both the port-side throttle lever and the starboard-side throttle lever into a forward position or a reverse position. In such a case, the operator may desire to move marine vessel 110 forward at a faster speed than is capable with the marine drive units being vectored at the angle α.

As further shown in FIG. 1, and by phase 3 of example implementation 100, as a result of the port-side throttle and the starboard-side throttle being moved in the same direction or moved into a same position, both the port-side marine drive unit and the starboard-side marine drive unit are positioned to generate propulsion that is parallel to the center line of the marine vessel. As such, the marine drive units may power the marine vessel 110 in a forward direction (when the two throttle levers are in forward) or a reverse direction (when the two throttle levers are in reverse) more quickly than if the marine drive units were vectored at the angle α.

According to some implementations, once one of the throttle levers is returned to neutral and/or returned to an opposite position than the other throttle lever, the marine drive units may return to the vectored at angle α. Accordingly, while in the operation mode, the marine drive units can temporarily be reconfigured to a position that is different from a fixed configuration defined by the operation mode based on position of the throttle levers. As such, when in the operation mode, the throttle levers can be configured to control the positioning of the two marine drive units.

As indicated above, FIG. 1 is provided merely as an example. Other examples are possible and may differ from what was described with regard to FIG. 1.

Figure 2:
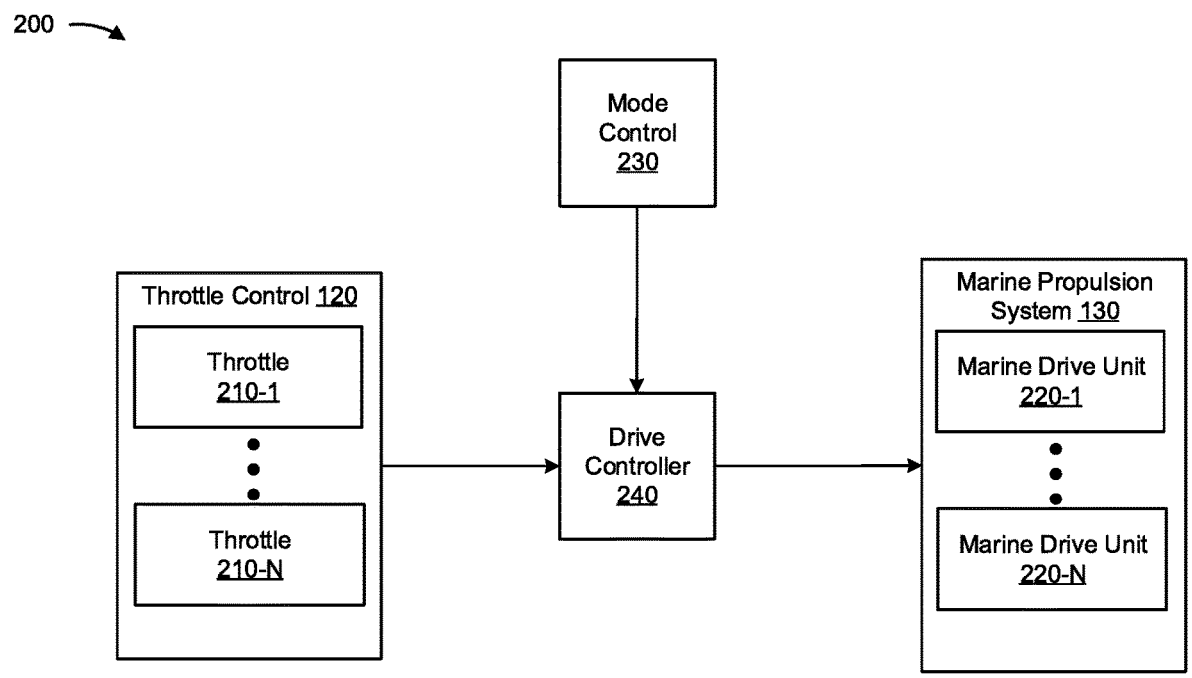
FIG. 2 is a diagram of an example drive system in which systems and/or methods, described herein, may be implemented.

FIG. 2 is a diagram of an example drive system 200 in which systems and/or methods, described herein, may be implemented. As shown in FIG. 2, drive system 200 includes a throttle control 120 with throttles 210-1 through 210-N (where N is an integer and N≥1) (hereinafter referred to collectively as "throttles 210," and individually as "throttle 210"), a marine propulsion system 130 with marine drive units 220-1 through 220-N (where N is an integer and N≥1) (hereinafter referred to collectively as "marine drive units 220," and individually as "marine drive unit 220"), a mode control 230, and a drive controller 240. Throttle control 120 of FIG. 2 may be used to implement throttle control 120 of FIG. 1 and marine propulsion system 130 of FIG. 2 may be used to implement marine propulsion system 130 of FIG. 1. Components of drive system 200 may interconnect via electrical connections (e.g., wired and/or wireless connections), mechanical connections, or a combination of electrical and mechanical connections. Drive system 200 may be associated with a marine vessel (e.g., marine vessel 110 of FIG. 1).

Throttle control 120 includes throttles 210 for controlling thrust or propulsion. Throttles 210 may be implemented by electronic, hydraulic, and/or mechanical throttle mechanisms. Throttles 210 may include a throttle lever to shift a gear and/or adjust propulsion output of a corresponding one of marine drive units 220. For example, each throttle 210 may be configured to control a position, a gear, and/or an amount of propulsion output associated with one of the marine drive units 220 (e.g., throttle 210-1 controls marine drive unit 220-1, throttle 210-2 controls marine drive unit 220-2, and so on).

Throttles 210 may be implemented via any suitable means. For example, throttle control 120 may include a throttle mount. Throttles 210 may be implemented by throttle levers mounted to the throttle mount, and the mount can be configured to enable throttles 210 to be shifted (e.g., by an operator) between forward, neutral, and reverse to correspondingly place marine drive units 220 in forward, neutral, or reverse. The throttle mount may include one or more detents or slots corresponding to one or more throttle positions of throttles 210. For example, a neutral detent may correspond to a neutral position of throttles 210, a forward idle detent may correspond to a forward idle detent of throttles 210, a reverse idle detent may correspond to a reverse idle detent of throttles 210, and/or the like. Furthermore, the degree to which the throttles 210 are shifted relative to the one or more detents may correspond to an amount of fuel that is to be supplied to marine drive units 220, and thus the amount of thrust or propulsion that is to be output from the marine drive units 220.

Marine propulsion system 130 includes marine drive units 220 that are configured to provide propulsion and control movement of the marine vessel. Marine drive units 220 may include any suitable type of marine drive. For example, marine drive units 220 may include azimuth thrusters (e.g., pods or propulsion pods), outboard drives, inboard/outboard drives, jet drives, and/or the like. Marine drive units 220 may generate propulsion in a direction corresponding to a steering mechanism of the marine vessel. Furthermore, marine drive units 220 may be controlled to generate propulsion in a direction corresponding to an operation mode of the marine vessel and positions of throttles 210.

Mode control 230 includes a user interface that enables a user (e.g., an operator) to set an operation mode for the marine vessel. Accordingly, the user may select an operation mode from a plurality of operation modes (e.g., standard mode, auto-pilot mode, fishing mode, anchor mode, docking mode, and/or the like). The operation mode may have a fixed configuration for marine drive units 220, and/or a particular control configuration for marine drive units 220, such that marine drive units 220 can be fixed in respective configurations and/or controlled in respective manners by throttles 210 and/or a steering mechanism according to the operation mode.

Drive controller 240 may include one or more apparatuses for monitoring one or more components of drive system 200 to control marine drive units 220 and/or the marine vessel. Drive controller 240 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, drive controller 240 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by drive controller 240. In some implementations, drive controller 240 may include a memory (e.g., a non-transitory computer-readable medium) capable of storing instructions, that when executed, cause the processor to perform one or more processes and/or methods described herein.

Drive controller 240 may receive one or more inputs from throttle control 120 and/or mode control 230 and provide an output to marine propulsion system 130. For example, drive controller 240 may receive an operation mode input from mode control 230 and throttle positions of throttles 210. Based on the operation mode input and positions of throttles 210, drive controller 240 may control a configuration of marine drive units 220 and/or an amount of propulsion output from marine drive units 220. For example, while in a particular operation mode as indicated by mode control 230, if throttle control 120 indicates that throttles 210 are in a same drive position (e.g., all forward or all reverse), drive controller 240 may reconfigure the marine drive units from a first configuration (e.g., a primary configuration associated with the operating mode) to a second configuration (e.g., a secondary configuration associated with the operating mode). As a more specific example, drive controller 240 may reconfigure marine drive units 220 from an angled position, within which marine drive units 220 are configured to generate propulsion in different directions relative to a center line of the marine vessel, to a parallel position, within which marine drive units 220 are configured to generate propulsion in a same direction relative to a center line of the marine vessel. Furthermore, while in that particular operation mode, drive controller 240 may return marine drive units 220 to a default or primary configuration once throttles 210 are not both in a same drive position.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, separate, and/or distributed components. Additionally, or alternatively, a set of components (e.g., one or more components) of drive system 200 may perform one or more functions described as being performed by another set of components of drive system 200.

Figure 3:
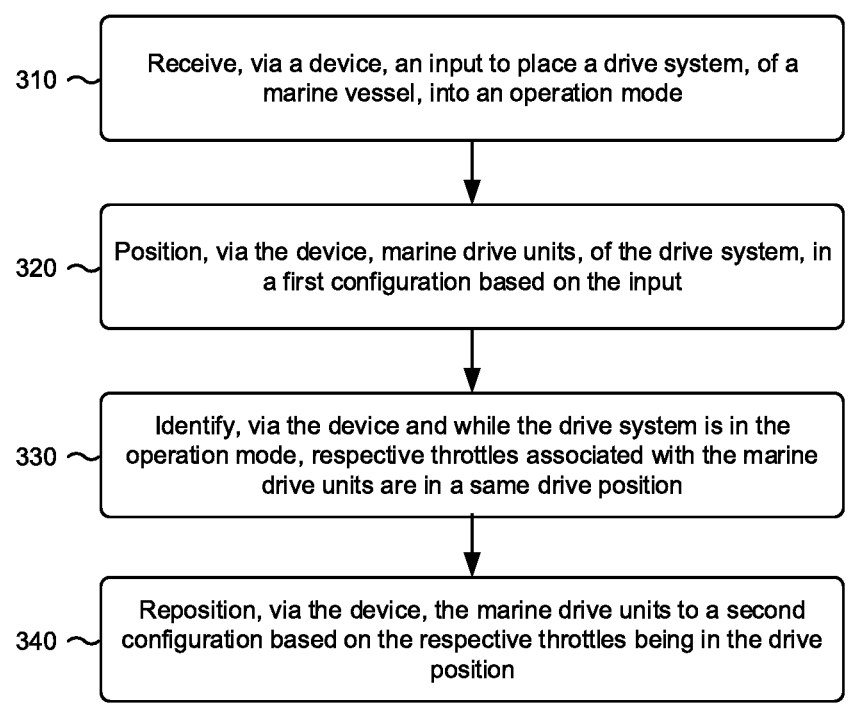
FIG. 3 is a flow chart of an example process associated with marine drive control.

FIG. 3 is a flow chart of an example process 300 associated with marine drive control. In some implementations, one or more process blocks of FIG. 3 may be performed by drive controller 240. In some implementations, one or more process blocks of FIG. 3 may be performed by another device or a group of devices separate from or including drive controller 240, such as throttle control 120, marine propulsion system 130, or mode control 230. The one or more process blocks of process 300 may be performed to maneuver and/or control a marine vessel (e.g., marine vessel 110).

As shown in FIG. 3, process 300 may include receiving an input to place a drive system, of a marine vessel, into an operation mode (block 310). For example, drive controller 240 may receive an operation mode input from mode control 230. In some implementations, drive controller 240 may receive the input based on an operator interacting with a user interface associated with mode control 230, a user interface of the marine vessel, and/or the like.

In some implementations, the operation mode configures the marine vessel to be controlled by drive controller 240 in a particular manner as defined by settings or specifications of the operation mode. For example, an operation mode may define how drive controller 240 is to control marine drive units 220. In some implementations, a first operation mode may cause drive controller 240 to use first control settings to control marine drive units 220 based on throttle positions of throttles 210 and a second operation mode may cause drive controller to use second control settings to control marine drive units 220 based on the throttle positions of throttles 210. In some implementations, according to at least one operation mode, throttle positions of the throttles can be used to control a configuration or positioning of marine drive units relative to a center line of the marine vessel. According to some implementations, while in a particular operation mode, drive controller 240 may configure marine drive units to be in respective fixed positions unless at least one of the throttles 210 are in a same drive position.

In this way, drive controller 240 may receive an input identifying an operation mode to permit drive controller 240 to control marine drive units 220 according to the operation mode.

As further shown in FIG. 3, process 300 may include positioning marine drive units, of the drive system, in a first configuration based on the input (block 320). For example, drive controller 240 may position marine drive units 220 in the first configuration. In some implementations, drive controller 240 may position the marine drive units based on receiving the input from mode control 230.

According to some aspects, drive controller 240 may store and/or access configurations of marine drive units according to an operation mode of the marine vessel. In some implementations, in one configuration, marine drive units 220 are configured to be vectored at an angle (e.g., an angle greater than 0 degrees, such as 45 degrees) relative to a center line of the marine vessel. As such, each of the marine drive units 220 are configured to generate propulsion at the angle relative to the center line of the marine vessel. Accordingly, in such a configuration, marine drive units 220 are each configured to generate propulsion in different directions. In another configuration, the marine drive units may be configured to generate propulsion in a same direction.

In this way, drive controller 240 may position marine drive units 220 to permit drive controller 240 to adjust control settings for throttles 210.

As further shown in FIG. 3, process 300 may include identifying, while the drive system is in the operation mode, that respective throttles associated with the marine drive units are in a same drive position (block 330). For example, drive controller 240 may identify throttles 210 are in the same drive position. In some implementations, drive controller 240 may identify throttles 210 are in the same drive position based on drive system 200 being placed in the operation mode, based positioning marine drive units 220 in the first configuration, and/or the like.

In some implementations, the same drive position is a forward position and, when throttles 210 are in the forward position, marine drive units 220 are configured to generate propulsion toward a stern of the marine vessel. In some implementations, the same drive position is a reverse position and, when throttles 210 are in the reverse position, marine drive units 220 are configured to generate propulsion toward a bow of the marine vessel.

In some implementations, drive controller 240 may determine that throttles 210 are in a same drive position after a threshold time period passes. For example, when at least two throttles 210 are in a same drive position for at least one tenth of a second, one half of a second, one second, and/or the like, the drive controller may determine that the throttles are in the same drive position. As such, if both throttles are in the same drive position before the threshold time period passes, drive controller 240 may not identify that the throttles 210 are in the same drive position until throttles 210 are in the same drive position for the threshold time period. Accordingly, accidental shifts of the throttles 210 (e.g., by an operator) may not result in changed control of marine drive units as an operator can shift the throttles back to the intended position before the threshold time period expires.

In some implementations, drive controller 240 may monitor throttle positions of throttles 210 relative to one or more detents of a throttle mount associated with throttles 210. For example, throttles 210 may be in a same drive position when throttles are on a same side of the detent and in a neutral position when throttles 210 are aligned with the detent. In some implementations, throttles 210 are not in the same drive position when throttles 210 are aligned with the neutral position and/or are in different drive positions (e.g., one in forward position and one in reverse position) when one throttle is on a first side of the detent and another throttle is on a second side of the detent.

In this way, drive controller 240 may identify that throttles 210 are in a same drive position to permit drive controller 240 to reposition or reconfigure marine drive units 220 according to settings for the operation mode.

As further shown in FIG. 3, process 300 may include repositioning the marine drive units to a second configuration based on identifying that the respective throttles are in the same drive position (block 340). For example, drive controller 240 may reposition marine drive units 220 to the second configuration. In some implementations, drive controller 240 may reposition marine drive units 220 based on an operator shifting throttles 210 to the same drive position, based on identifying settings for controlling marine drive units 220 when in the operation mode, and/or the like.

In some implementations, the second configuration may be a parallel configuration. As such, when drive controller 240 repositions marine drive units 220 from the first configuration to the second configuration, drive controller 240 may switch marine drive units 220 from being configured to generate propulsion in different directions to being configured to generate propulsion in a same direction (e.g., while the throttles are in the same drive position). In such cases, when in the second configuration, marine drive units 220 may be configured to generate propulsion that is parallel to a center line of the vessel. As such, marine drive units 220, while in the second configuration, may generate propulsion toward the stern of the marine vessel (e.g., forward propulsion) when the same drive position is a forward position and may generate propulsion toward a bow of the marine vessel (e.g. reverse propulsion) when the same drive position is a reverse position.

In some implementations, if at least one of the throttles 210 is returned to a different drive position and/or a neutral position, drive controller 240 may return or reposition marine drive units to be in the first configuration. As such, the second configuration may be a temporary or secondary configuration of marine drive units 220 while in the operation mode, and the first configuration may be a default or primary configuration of marine drive units 220 while in the operation mode.

In this way, drive controller 240 may configure and/or control marine drive units 220 according to an operation mode of drive system 200 and/or the marine vessel.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Accordingly, a drive system is provided herein for marine drive control based on an operation mode the drive system and/or a marine vessel associated with the drive system.

INDUSTRIAL APPLICABILITY

The disclosed drive controller 240 may be used with any marine vessel where alternative control of drive system is desired using throttle control. The disclosed drive controller 240 may provide variable control of drive system 200 based on a selected operation mode of drive system 200 and/or a marine vessel (e.g., marine vessel 110) associated with drive system 200.

In some instances, the marine vessel can be operated in association with sport fishing. As such, the marine vessel can be configured to be in a sportfish mode to enhance the sport fishing experience and/or facilitate catching a fish. More specifically, when a fish is on a fishing line or hooked, marine drive units of the marine vessel can be configured to enable the marine vessel to be steered to assist a fisherman on the marine vessel to catch the fish. For example, marine drive units 220 may be vectored at angle while in sport fish mode. Accordingly, while the fisherman is reeling in the fish, a captain (or operator) of the marine vessel can use the sport fish mode to align a center line of the marine vessel with the fishing line by increasing one of the throttles 210, while another throttle 210 remains in a neutral position or is positioned in an opposite drive position, to steer the stern of the marine vessel toward the fish. As such, the captain, using the sport fish mode of the marine vessel, can quickly and easily keep the sport fish off the stern of the marine vessel so the fisherman can remain in a single location on the marine vessel and/or reel the fish in at a same angle throughout the fishing experience.

In some instances, it may be beneficial to maneuver the marine vessel forward or aft in a quick manner. For example, if a fish on the line swims toward the stern of the marine vessel, tension in the fishing line can be decreased and the fish can come loose. As such, the captain may wish to move forward as needed to return an appropriate amount of tension in the fishing line. Additionally, or alternatively, if the fish is swimming away from the stern of the marine vessel, the tension in the fishing line can increase which may result in snapping or breaking the fishing line. As such, the captain may wish to move in reverse as quickly as needed to lessen the tension in the fishing line. However, when marine drive units are in a configuration in which each of the marine drive units 220 are to generate propulsion in different directions (e.g., vectored angles relative to the center line of the marine vessel), the captain may not be able to accelerate or maneuver the marine vessel in forward or reverse quickly enough to achieve the desired tension in the fishing line.

The disclosed drive controller 240 may enable a reconfiguration of marine drive units 220 to place the marine drive units in a position to provide optimal forward or aft movement of the marine vessel. In previous techniques, to move the marine vessel forward or reverse at a desired speed, the captain may need to disable sport fish mode. However, drive controller 240 can allow for variable control of marine drive units 220 using throttles 210 without a user interaction that deactivates the operation mode and/or reactivates the operation mode after completion of a maneuver. Accordingly, drive controller 240 may decrease response time to control a stern of the marine vessel (which can conserve costs associated with operating the marine vessel in sport mode, such as fuel costs, engine wear, and/or the like). Furthermore, drive controller 240 may conserve processing resources associated with a captain having to change an operation mode to complete a maneuver.

As used herein, the term component is intended to be broadly construed as hardware, firmware, or a combination of hardware and software.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A method, comprising:
receiving, by a device, an input to place a drive system of a marine vessel into an operation mode;
positioning, by the device, two or more marine drive units of the drive system in a first configuration based on the input;
identifying, by the device and while the drive system is in the operation mode, that respective throttles associated with the two or more marine drive units are in a same drive position;
repositioning, by the device, the two or more marine drive units to a second configuration based on identifying that the respective throttles are in the same drive position; and
returning, by the device, the two or more marine drive units to the first configuration when at least one of the respective throttles is retuned to a neutral position or when the respective throttles are in different drive positions.

2. The method of claim 1, wherein, when in the first configuration, at least one of the two or more marine drive units are configured to generate propulsion at a vectored angle relative to a center line of the marine vessel.

3. The method of claim 1, wherein, when in the second configuration, the two or more marine drive units are configured to generate propulsion in a direction that is parallel to a center line of the marine vessel.

4. The method of claim 1, wherein, when in the first configuration, at least one of the two or more marine drive units are configured to generate propulsion at a vectored angle relative to a center line of the marine vessel and, when in the second configuration, the two or more marine drive units are configured to generate propulsion parallel to the center line of the marine vessel.

5. The method of claim 1, wherein, while in the operation mode, the two or more marine drive units are configured to be in respective fixed positions unless at least one of the respective throttles are in the same drive position.

6. The method of claim 1, wherein the same drive position is a forward position and, when the respective throttles are in the forward position, the two or more marine drive units are configured to generate propulsion toward a stern of the marine vessel.

7. The method of claim 1, wherein the same drive position is a reverse position and, when the respective throttles are in the reverse position, the two or more marine drive units are configured to generate propulsion toward a bow of the marine vessel.

8. The method of claim 1, wherein the two or more marine drive units comprise:
azimuth thrusters,
outboard drives,
inboard/outboard drives, or
jet drives.

9. A device, comprising:
one or more processors to:
receive an operation mode input to place a drive system, of a marine vessel, into an operation mode;
configure a first marine drive unit and a second marine drive unit to be positioned in a first configuration based on the operation mode input,
wherein the first configuration corresponds to positioning the first marine drive unit and the second marine drive unit for control of the marine vessel while the drive system is in the operation mode;

identify, while the drive system is in the operation mode, that a first throttle and a second throttle are both in a same drive position,
  wherein the first throttle is associated with the first marine drive unit and the second throttle is associated with the second marine drive unit;
configure the first marine drive unit and the second marine drive unit to be repositioned into a second configuration while both the first throttle and the second throttle are in the same drive position; and
configure the first marine drive unit and the second marine drive unit to return to the first configuration when at least one of the first throttle or the second throttle is retuned to a neutral position or when the first throttle and the second throttle are in different drive positions.

10. The device of claim 9, wherein, when configuring the first marine drive unit and the second marine drive unit to return to the first configuration, the one or more processors are to:
  configure the first marine drive unit and the second marine drive unit to return to the first configuration when at least one of the first throttle or the second throttle is retuned to Hall the neutral position.

11. The device of claim 9, wherein, when configuring the first marine drive unit and the second marine drive unit to return to the first configuration, the one or more processors are to:
  configure the first marine drive unit and the second marine drive unit to return to the first configuration when one of the first throttle or the second throttle is placed in a reverse position.

12. The device of claim 9, wherein, while in the operation mode, the one or more processors are to configure the first marine drive unit and the second marine drive unit to be fixed in the first configuration unless the first throttle and the second throttle are in the same drive position.

13. The device of claim 9, wherein when the first throttle and the second throttle are in the same drive position, the first throttle and the second throttle are both in a forward position or the first throttle and the second throttle are both in a reverse position.

14. The device of claim 9, wherein the one or more processors, when identifying that the first throttle and the second throttle are in the same drive position, are to:
  determine that the first throttle and the second throttle are both in the same drive position for a threshold time period.

15. The device of claim 9, wherein when in the first configuration, the first marine drive unit and the second marine drive unit are configured to generate propulsion at respective angles relative to a center line of the marine vessel and, when in the second configuration, the first marine drive unit and the second marine drive unit are both configured to generate propulsion in a same direction that is parallel to the center line of the marine vessel.

16. The device of claim 9, wherein the one or more processors are further configured to:
  monitor the first throttle and the second throttle based on receiving the operation mode input to identify respective throttle positions, of the first throttle and the second throttle, relative to a detent of the first throttle and the second throttle,
    wherein the first throttle and the second throttle are in the same drive position when the respective throttle positions are on a same side of the detent and the first throttle and the second throttle are in a neutral position when the respective throttle positions are aligned with the detent.

17. The device of claim 9, wherein, while in the operation mode, the first marine drive unit and the second marine drive unit are configured to provide forward propulsion at respective fixed angles relative to a center line of the marine vessel, and wherein the one or more processors are to:
  determine that the same drive position comprises a reverse position; and
  configure the first marine drive unit and the second marine drive unit to provide reverse propulsion relative to the marine vessel.

18. A non-transitory computer-readable medium storing instructions, the instructions comprising:
  one or more instructions that, when executed by one or more processors, cause the one or more processors to:
    receive an input to place a drive system, of a marine vessel, into an operation mode;
    position two or more marine drive units, of the drive system, in a first configuration based on the input,
      wherein, when in the first configuration, each of the two or more marine drive units are configured to generate propulsion in different directions relative to a center line of the marine vessel;
    identify, while the drive system is in the operation mode, that a throttle control, associated with the two or more marine drive units, is in a same drive position;
    position the two or more marine drive units into a second configuration based on the throttle control being in the same drive position,
      wherein, when in the second configuration, each of the two or more marine drive units are configured to generate propulsion in a same direction relative to the center line of the marine vessel; and
    return the two or more marine drive units to the first configuration when the throttle control is retuned to a neutral position or when the throttle control is placed in a different drive position.

19. The non-transitory computer-readable medium of claim 18, wherein when the drive system is in the operation mode, the throttle control controls a position of the two or more marine drive units and an amount of fuel to the two or more marine drive units and when the drive system is not in the operation mode, the throttle control does not control the position of the two or more marine drive units.

20. The non-transitory computer-readable medium of claim 18, wherein the marine vessel moves faster when the two or more marine drive units are positioned in the second configuration than when the two or more marine drive units are positioned in the first configuration.

* * * * *